United States Patent
Tol et al.

(10) Patent No.: US 7,020,799 B2
(45) Date of Patent: Mar. 28, 2006

(54) METHOD OF AND A SYSTEM TO PLAY A MEDIA FILE

(75) Inventors: Ronald Marcel Tol, Eindhoven (NL); Johannis Friso Rendert Blacquiere, Eindhoven (NL)

(73) Assignee: Koninklijke Phillips Electronics N.V., Eindhoven (NL)

( * ) Notice: Subject to any disclaimer, the term of this patent is extended or adjusted under 35 U.S.C. 154(b) by 539 days.

(21) Appl. No.: 10/140,503

(22) Filed: May 7, 2002

(65) Prior Publication Data

US 2002/0168180 A1  Nov. 14, 2002

(30) Foreign Application Priority Data

May 9, 2001 (EP) ................................. 01201690

(51) Int. Cl.
*G06F 11/00* (2006.01)

(52) U.S. Cl. ....................... 714/8; 369/53.17
(58) Field of Classification Search ................ 714/42, 714/5, 7–8, 57; 360/31, 55; 369/27.01, 369/30.07, 53.17; 386/46, 47, 51
See application file for complete search history.

(56) References Cited

U.S. PATENT DOCUMENTS

| | | | | |
|---|---|---|---|---|
| 4,914,527 A | * | 4/1990 | Asai et al. .................... 386/75 |
| 5,012,361 A | * | 4/1991 | Chiba et al. .................. 386/51 |
| 5,187,617 A | * | 2/1993 | Kaminaga ..................... 360/64 |
| 5,237,553 A | | 8/1993 | Fukushima et al. ........... 369/58 |
| 5,404,511 A | * | 4/1995 | Notarianni .................... 707/1 |
| 5,459,621 A | * | 10/1995 | Tsuji et al. ................... 360/32 |
| 5,889,631 A | * | 3/1999 | Hobson ....................... 360/75 |
| 2003/0191981 A1 | * | 10/2003 | Park et al. .................... 714/7 |
| 2004/0223430 A1 | * | 11/2004 | Lee et al. ................. 369/47.14 |

* cited by examiner

*Primary Examiner*—Dieu-Minh Le
(74) *Attorney, Agent, or Firm*—Larry Liberchuk

(57) ABSTRACT

Systems (112) that can play real-time audio and/or video often have strict timing constraints for reading, processing and playing the data. However, when data is corrupt or sectors from a data carrier (100) are incorrect, the system tries to recover from the corrupt data. In order to prevent that the corrupt data causes the system to miss its timing requirements, the current invention administrates the corrupt sectors of the data carrier (110, 114) and conceals the corrupt data from the application by returning predefined data instead of the corrupt data. Furthermore, the current invention maintains a mapping of logical file blocks to the corrupt sectors to prevent a drive from trying to read the corrupt data.

20 Claims, 5 Drawing Sheets

Figures 1, 2:
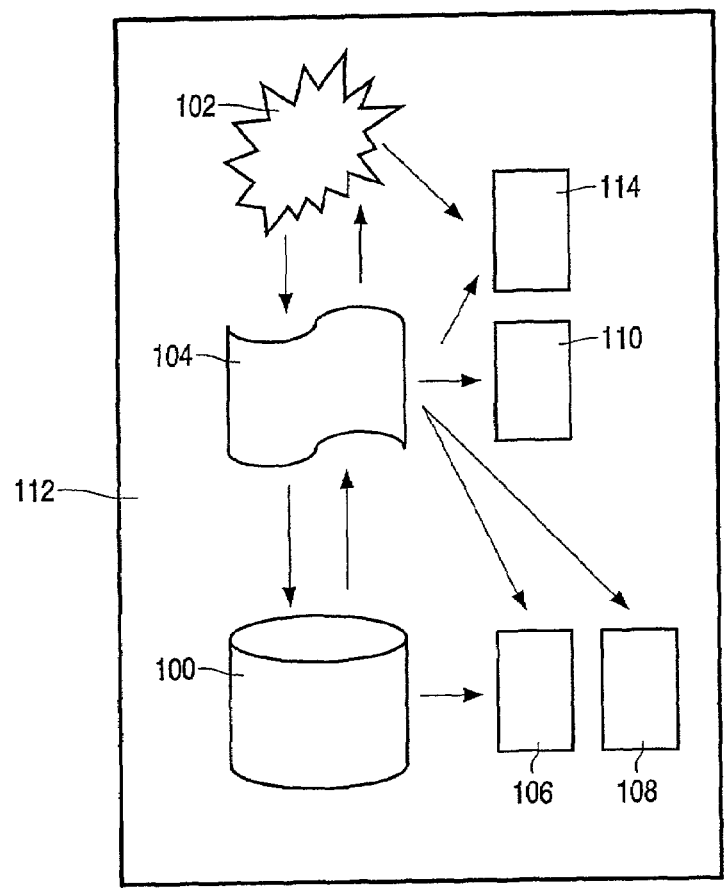

| Logical Sector Number | Physical Sector Number |
|---|---|
| 0 → | 0 |
| 1 → | 1 |
| 2 → | 2 |
|  | 3 |
| 3 → | 4 |
| 4 → | 5 |
| 5 → | 6 |
|  | 7 |
| 6 → | 8 |
| 7 → | 9 |

METHOD OF AND A SYSTEM TO PLAY A MEDIA FILE

The invention relates to a method of playing a media file from a data carrier, the method comprising a first step of administrating that the data carrier comprises a corrupt sector.

Furthermore, the invention relates to a system to play a media file from a data carrier, the system comprising administration means conceived to administrate a corrupt sector on the data carrier.

Furthermore, the invention relates to a method of recording a media file on a data carrier, and a system to record a media file on a data carrier.

An embodiment of the methods and system of the kind set forth above is known from patent U.S. Pat. No. 5,237,553. Here, a data recording medium is used for which a sequential access zone is allocated that consists of a data area for recording real time data such as sounds or video images. Furthermore, there is allocated:

a C (certification) list area for recording a C defect list managing defective sectors detected in the formatting process, and a G (growing) list area for recording a G defect list managing defective sectors detected in the recording process of data, and a random access zone consisting of a data area for recording random access data such as code data, a spare area for replacing defective sectors detected in the recording process, an R (relation) list area for recording an R defect list managing the relation between defective sectors and corresponding spare sectors. In the recording process of data in the sequential access zone, data is recorded while defective sectors registered in the C defect list and G defect list are skipped, thereby achieving recording of both the random access data and the real time data. The C, G, and R list areas are also used for reading the random access data and the real time data.

It is an object of the current invention to provide a method of playing a media file according to the preamble that manages corrupt sectors on a data carrier in an improved way. To achieve this object, the method according to the invention is characterized in that the method further comprises:

a second step of mapping a file block to the corrupt sector, wherein the media file comprises the file block, a third step of playing the media file wherein predefined data is played, the predefined data being used to conceal the corrupt sector. By mapping file blocks to sectors of a recording medium, the file blocks can reflect the physical condition of the recording medium. This condition is relevant for, for example, reading and writing media data to and from a recording medium, because corrupt sectors may not be written and read correctly. By using a file system which controls amongst others reading and writing to files, this file system only needs to consult the file blocks in stead of the sectors of the recording medium. Therefore, the recording medium can be prevented from accessing its own administration for corrupt sectors that can be time consuming. Furthermore, by concealing corrupt sectors from the application with predefined data, an application showing for example a video frame or playing audio can receive defined data when the application tries to access the file blocks that are mapped to corrupt sectors. This prevents the application from erroneous situations like an application crash or failure that can occur when the application receives undefined data.

The sectors may be corrupted because of physical damage to the data carrier. This physical damage may occur after data has been written to the sectors, which can lead to corrupt data. There can be applications that can show frames, or, in general play media files, which cannot handle corrupt data, because corrupt data can have an unknown data structure for which there is no error recovery. The corrupt data can then cause the application to fail. In order to prevent that an application fails, the file system may return predefined data to the application in case the application tries to access the file blocks that are mapped to corrupt sectors.

An embodiment of the method according to the current invention is described in claim 2. By concealing corrupt data with predefined data that may comprise a defined data structure for a media application, the media application is prevented from reacting to corrupt data that can have an undefined data structure. This reaction can take several milliseconds, which is noticed by a user or it can cause the application to fail, which must be prevented. The data may be corrupted during writing because, for example, the data is not sent at the correct speed to the recording medium or when, in the case that the data is sent via a network, there was a network failure. Data may also be corrupted after it is written when, for example the recording medium is damaged.

An embodiment of the method according to the current invention is described in claim 3. By mapping a status to the file block that refers to the corrupt sector, the status can be used to refer to the predefined data that conceals the corrupt sector. The status can contain a predefined byte stream, which can be used as predefined data or it can for example contain a reference to another file block or file blocks that contain a predefined byte pattern. In the latter case, the predefined data can be updated. Furthermore, the status can be used to indicate if the corrupt sector can be written by new data. The size of the byte pattern can be equal to the size of the corrupt sector.

An embodiment of the method according to the invention is described in claim 4. By not reading or skipping the corrupt data, no time is consumed trying to read and/or retrying to read, the data from the medium. Then only the non-corrupt data can be read from the medium, and the file system can return predefined data for all file blocks that refer to corrupt sectors.

A further object of the invention is to provide a system to play a media file from a data carrier according to the preamble that handles corrupt sectors on a data carrier in an improved way. To achieve this object, the system to play a media file according to the current invention is characterized in that the system further comprises:

mapping means conceived to map a file block to the corrupt sector, wherein a media file comprises the file block, playing means conceived to play the media file wherein predefined data is played, the predefined data being used to conceal the corrupt sector.

Embodiments of the system to play a media file according to the invention are described in claims 8 to 10.

A further object of the invention is to provide a method of recording a media file on a data carrier according to the preamble that handles corrupt sectors on a data carrier in an improved way. To achieve this object the method of recording a media file according to the current invention is characterized in that the method further comprises:

a second step of mapping a file block to the corrupt sector, wherein the media file comprises the file block, a third step of recording the media file, wherein no data is written to the corrupt sector.

Embodiments of the method of recording a media file according to the invention are described in claims 5 to 10.

A further object of the invention is to provide a system to record a media file according to the preamble that handles corrupt sectors on a data carrier in an improved way.

To achieve this object the system to record a media file is characterized in that the system further comprises:

mapping means conceived to map a file block to the corrupt sector, wherein a file comprises the file block, playing means conceived to play the media file wherein predefined data is played, the predefined data concealing the corrupt sector.

Embodiments of the system to record a media file according to the invention is described in claim 12.

Figure 3:
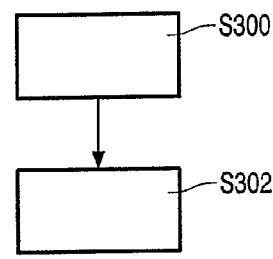
Figure 4:
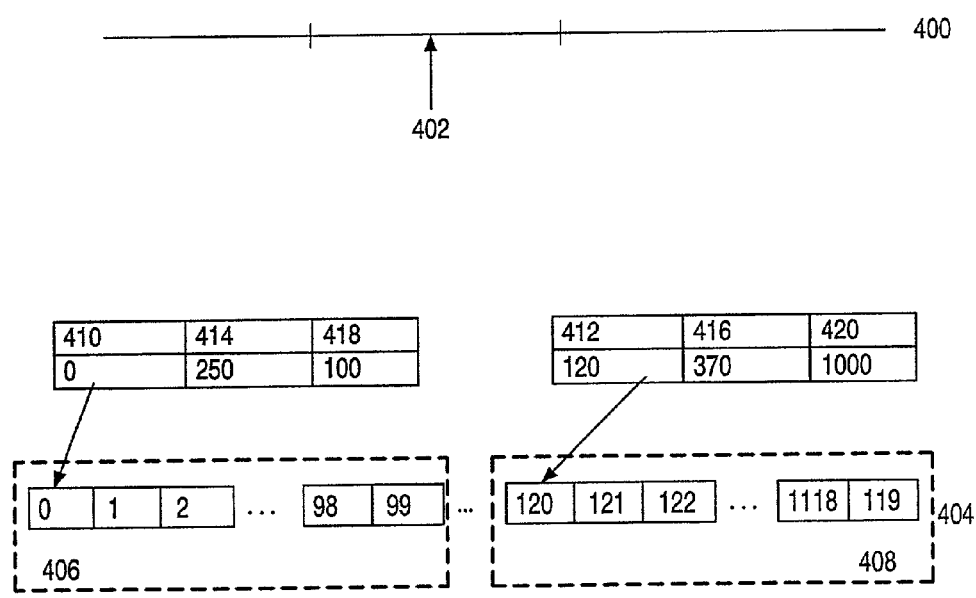
Figure 5:
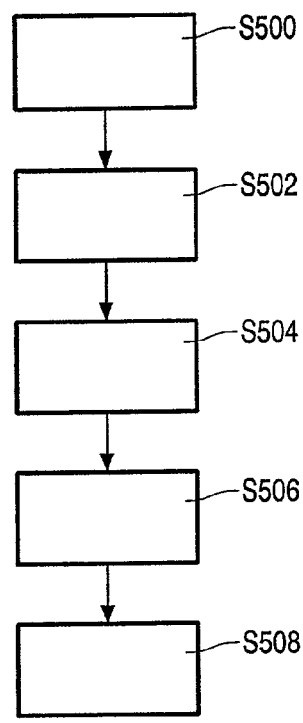
Figure 6:
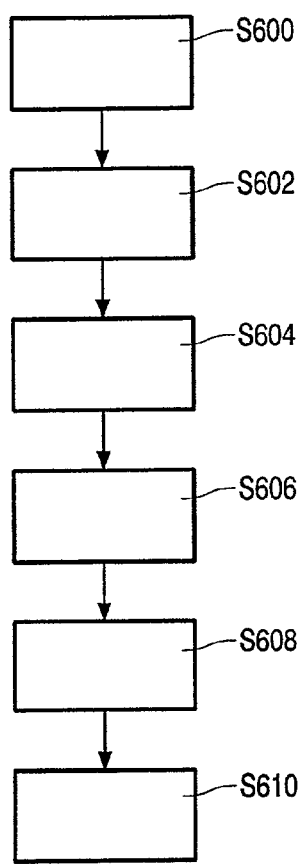

The invention will be described by means of embodiments illustrated by the following drawings:

FIG. 1 illustrates an overview a system that plays real-time video and/or audio, FIG. 2 illustrates a Logical Sector Number to Physical Sector Number mapping, FIG. 3 illustrates the main initialization step of the methods according to the invention, FIG. 4 illustrates the resulting file schematically, FIG. 5 illustrates the main steps of the method of recording a media file according to the invention, FIG. 6 illustrates the main steps of the method of playing a media file according to the invention.

Figure 7:
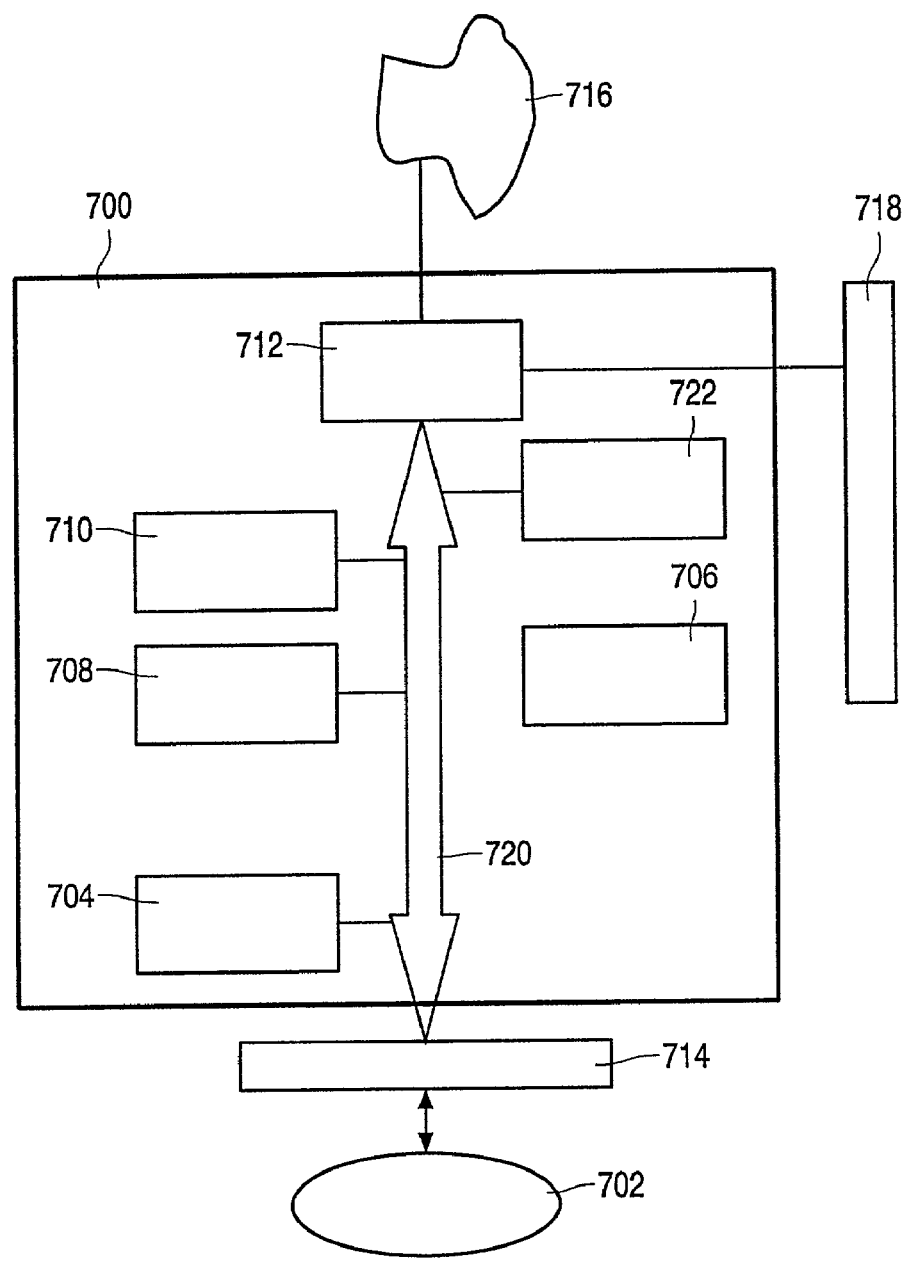
Figure 8:
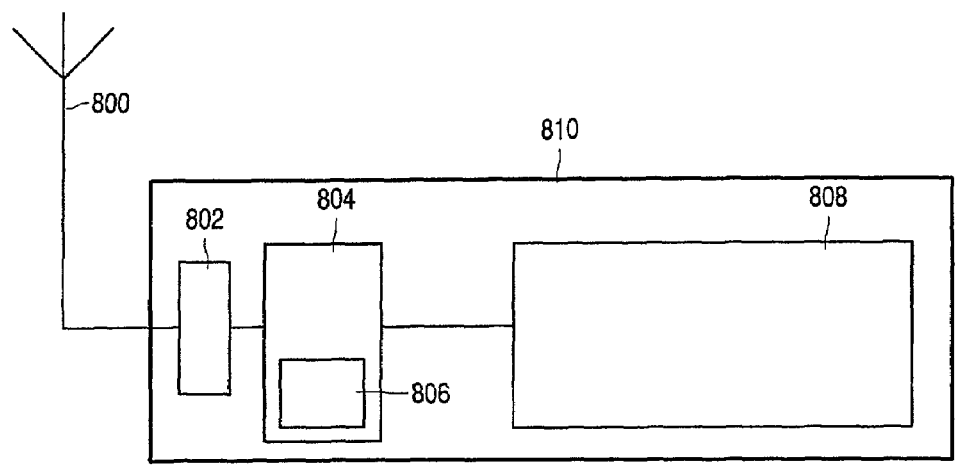
Figure 9:
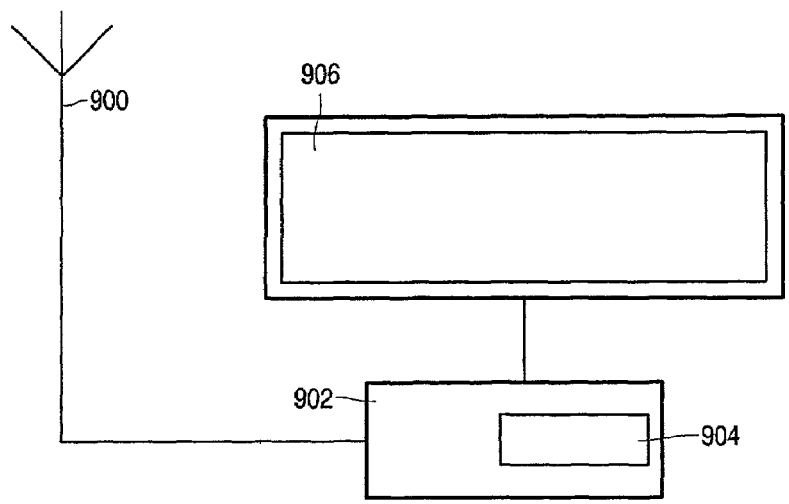

FIG. 7 illustrates the most important parts of an embodiment of the system according to the invention in a schematic way, FIG. 8 illustrates a television set in a schematic way that contains an embodiment of the system according to the invention, FIG. 9 illustrates a set-top box in a schematic way that contains an embodiment of the system according to the invention.

FIG. 1 shows an overview of a system 112 that plays real-time video and/or audio. Systems that play real-time video and/or audio often have strict timing constraints. For example, a 50 Hz video indicates that one video frame must be read from disk, processed and shown within 0.02 seconds. This means that each of these steps must be performed within a limited time period, which does not leave much room for error recovery. Error recovery can be performed by, for example the disk drive that controls a disk 100 or another kind of storage medium like a compact disk, removable disk etc. The drive first performs a number of retries to read data before deciding that a sector from which the data is being read has gone bad and the data must be skipped. However, this error recovery takes time, which has a negative effect on the quality of the played video or audio. An application 102, that processes the read data and displays the video frames and/or plays the audio, can also perform error recovery. When the disk drive succeeds in reading data, but the data itself is corrupt, the application 102 can evaluate the data before processing it or it can react to errors received from the processing steps performed. In the worst case, the application 102 can crash. This error recovery also takes time, which is sparsely available in this real-time processing domain. Therefore, the filesystem 104 prevents that corrupt sectors are being re-read by the disk drive and it shields the application from corrupt data present on the disk 100.

Corrupt sectors are the result from two cases. In the first case a sector is defect or bad and cannot contain data correctly. The sectors are then physically damaged due to imperfections in the disk manufacturing process or due to a scratch. These sectors are detected during formatting of the disk 100 and the disk drive records the Physical Sector Number (PSN) of the sector in its Primary Defect List 106 (PDL). A Secondary Defect List 108 (SDL) is used to record sectors which go bad after the disk has been formatted. Sectors can go bad after formatting as a result from dust or dirt on the surface of the disc or because of any other physical damage. The disk drive detects these bad sectors when it tries to write to these sectors and updates its SDL 108. Usually, the PDL and SDL are recorded on the disk too and can be retrieved from the disk. The filesystem 104 controls its own defect list. This defect list is called the bad sector alarm list 110 and is used by the filesystem to administrate the PSN of a sector when a write error is indicated by the disk drive. The number of time consuming retries to write to these sectors before deciding that the sector is bad is reduced after the indication of the write error. This reduction is such that it fits in the allowed time available for reading a sector.

When the disk drive detects a bad sector when it tries to read from a bad sector, the SDL 108 and bad sector alarm list 110 are updated too. Furthermore, the number of time consuming retries to read from these sectors before deciding that the sector is bad is reduced. The reduction is such that it fits in the allowed time available for reading a sector.

When the system 112 has time, i.e. it finished recording the audio or video, the bad sector alarm list 110 is written to the disk 100. When the disk 100 is write protected the bad sector alarm list 110 is kept in memory.

In the second case, the sector itself is not bad, but the data present is corrupt because it is, for example, not compliant anymore to a valid video or audio format such as MPEG or MPEG4. Data can also be corrupt because it is not completely written to the sector. The data stream can be interrupted during writing because of a power failure or a network failure, when the data is written over a network to a disk. The application 102 detects this failure or it receives corrupt data when reading from the file system. Then it administrates the PSN of the physically correct sectors containing corrupt data in a bad data alarm list 114. It is also possible that the application 102 administrates a margin of a few sectors before and a few sectors after the corrupt data sectors. The bad data alarm list 114 can also be accessed by the filesystem 104 and is written to a predefined position on the disk when the system 112 has time. When the disk 100 is not write protected, the bad data alarm list 114 is written to the disk 100. When the disk 100 is write protected the bad data alarm list 114 is kept in memory. It is also possible that the filesystem 104 administrates the bad data sectors in the bad data alarm list 114. When the system 112 has time, the application 102 can write the appropriate correct data still preserved in memory to the sectors mentioned in the bad data alarm list 114 via the filesystem 104 and erase those sectors from the bad data alarm list 114.

The filesystem 104 mounts the disk 100 and reads the PDL 106 and SDL 108 from the disk. The mentioned sectors in these lists are used to construct the bad sector alarm list 110. When the disk 100 is not write-protected, the bad sector alarm list 110 and bad data alarm list 114 are written to the disk 100. When the disk is, for example, a removable disk, that can be updated by an other system, the content of the SDL 108 can change because of bad sectors detected by the other system. When the disk is then mounted by the original filesystem, the content of the bad sector alarm list 110 is compared to the contents of the PDL 106 and SDL 108 and updated according to these contents.

Instead of administrating the PSN it is also possible to administrate the Logical Sector Number (LSN) of a sector and use an LSN to PSN and vice versa mapping. This mapping is illustrated in FIG. 2.

FIG. 3 illustrates the main initialization step of the methods according to the invention. Within Step S300 the disk 100 is mounted by the filesystem 104. The filesystem 104 retrieves the PDL 106 and SDL 108 from the disk. The filesystem uses the PSN of the sectors denoted in both lists to fill the bad sector alarm list 110. Within Step S302 the filesystem creates a logical structure on top of all sectors of the disk 100. This logical structure consists of blocks that are grouped into files. Blocks can be of any size of bytes. The blocks belonging to one file can be scattered anywhere of the disk. In order to identify the blocks belonging to a file, the filesystem uses indexing via a file index table. A complete movie can result into one file or one song can result into one file. The file index table is also created within Step S302. The file index table contains for each file an index containing the pointers to the addresses of the blocks belonging to one file. Two other ways to identify files from blocks are: first, using a linked list, wherein each block of data includes a pointer to the next block of data; second, using a linked table, wherein the linked list of pointers to blocks for each file is stored in a file allocation table. For each sector present in the bad sector alarm list 110, the file system does create an index, but this index does not contain a pointer to a block. Instead the index contains a status. This status is used to return predefined data to the application upon a read request. When the status equals "x", all zeros are returned to the application, when the status equals "y", all ones are returned to the application. Other byte patterns that do not cause the application to fail, like for example a byte pattern indicated by the application, can be returned too. An application can also fail, when it does not meet its timing requirements. Furthermore, the status can be used to contain a pointer referencing blocks (and sectors) that contain predefined data. A schematic illustration of the resulting file is shown in FIG. 4. Here 400, is a schematic view of the disk, wherein 402 indicates a bad sector. The file 404 comprises then two extents 406 and 408 of data blocks. Each extent is addressed by an offset 410 and 412, a starting sector 414 and 416 and a length 418 and 420. The file system reserves 1120 blocks to write the complete file, but blocks 100 to 119 can not contain data.

FIG. 5 illustrates the main steps of the method of recording a media file according to the invention. In order to record a media file, the application 102 requests the filesystem 104 to write data to the disk 100. Recording a media file means for example, recording a video file from a movie shown on television or recording a photo file from a digital photo or recording an audio file for the audible signal received together with the movie. Upon a write request, the filesystem 104 allocates a file of sufficient size within S500. When the application knows an estimate of the size of the file in advance, this size is passed to the file system. When a user requests to record a movie of an hour and the application knows the maximum byte stream it receives per second, the size of the file can be estimated in advance. Within this step the filesystem 104 consults its bad sector alarm list 110. For those sectors present in this list, the filesystem 104 updates its indices to the blocks as previously described. Within step S502 the filesystem 104 starts recording the media data it receives from the application onto the disk 100. Within S504 the filesystem 104 receives a write error from the disk drive indicating that a sector can not be written. The disk drive updates its SDL 108. Within step S506 the filesystem 104 updates its bad sector alarm list 110. Furthermore, the file index table is updated as previously described. Within S508, the data contained in the logical memory blocks that refer to the bad sectors is deleted from the logical memory blocks. Furthermore, an appropriate status is added to the indices originally referring to these blocks as previously described. This step S508 is performed when the filesystem has time, for example in the background or upon completion of the recording session.

FIG. 6 illustrates the main steps of the method of playing a media file according to the invention. In order to play a media file, the application 102 requests the filesystem 104 to read data from the disk 100. Playing a media file means for example, showing it on screen in case of a video file or photo file or playing an audible signal in case of an audio file. Upon a read request from the application for a media file, within step S600 the file system consults its file index table to determine the relevant blocks that belong to the requested media file. Within step S602, the filesystem 104 requests the disk drive to read data from the sectors that are referenced by the relevant blocks. For those indices that do not reference blocks, the predefined data determined by the status as previously described is read. For these indices, the disk drive is not requested to read data from the disk, but the disk drive skips the bad sectors. Within step S604 the read data is returned by the filesystem to the application. Within step S606, the application processes the read data. When an error occurs during processing of this data or when the application first screens the read data to comply to the expected format before processing, then the sector from which the data is read is added to the bad data alarm list 114. Within step S608, the application plays the media file by showing the video frames, or images or playing the audio file. The predefined data can be used to represent black areas in the video frames or the image, or by missing fragments from an audible signal. This predefined data is thus used to prevent the application from crashing or playing strange artifacts. Within step S610, the filesystem uses the bad data alarm list 114 to update its file index table similar to the update based upon the bad sector alarm list 110. Then, within a next read request of the same file by the application, the sectors containing the bad data are skipped too.

The order of steps in the described embodiments of the methods according to the current invention is not mandatory, a person skilled in the art may change the order of steps or perform steps concurrently using threading models, multi-processor systems or multiple processes without departing from the concept as intended by the current invention.

FIG. 7 illustrates the most important parts of an embodiment of the system according to the invention in a schematic way. Here the system 700 is able to both record and play a media file as previously described. The system reads and writes from and to a compact disk 702 which can be read and written by the laser reader/writer 714. The PDL 106 and SDL 108 are written on the compact disk 702. The filesystem 104 resides in memory 706 and receives its data via a data bus 720 which is connected to a CPU 722. The disk driver resides in memory 704 and can be instructed by the filesystem to read or write from and to the compact disk 702. The file index table used by the filesystem to group logical blocks into files resides in memory 708 and can be updated by the filesystem. Memory 710 contains the predefined data that has to be returned in case of a corrupt sector as previously described. This predefined data can also be read from predefined positions on the compact disk 702. Memory 708 contains the bad sector alarm list 110 and the bad data alarm list 114 too. Furthermore, the system comprises a multi-media application that resides in memory 712. The multi-media application can play audio, video, show images etc. and performs the processing of the data. Furthermore, the system 700 is connected to a loudspeaker 716 and a screen 718.

FIG. 8 illustrates a television set 810 in a schematic way that comprises an embodiment of the system according to the invention Here an antenna, 800 receives a television signal. Any device able to receive or reproduce a television signal like, for example, a satellite dish, cable, storage device, internet, or Ethernet can also replace the antenna 800. A receiver, 802 receives the signal. The signal may be for example digital, analogue, RGB or YUV. Besides the receiver 802, the television set contains a programmable component, 804, for example a programmable integrated circuit. This programmable component contains a system according to the invention 806. A television screen 808 shows images that are received by the receiver 802 and are processed by the programmable component 804. When a user wants to record the received signal, for example a movie, the system according to the invention 806 records the received signal on the recording device like a DVD+RW, a compact disk or a harddisk. When a user wants to play a recorded movie, the system according to the invention 806 retrieves the appropriate data from the recording device.

FIG. 9 illustrates, in a schematic way, the most important parts of a set-top box that comprises an embodiment of the system according to the invention. Here, an antenna 900 receives a television signal. The antenna may also be for example a satellite dish, cable, storage device, internet, Ethernet or any other device able to receive a television signal. A set-top box 902, receives the signal. The signal may be for example digital, analogue, RGB or YUV. Besides the usual parts that are contained in a set-top box, but are not shown here, the set-top box contains a system according to the invention 904. When a user wants to record the received signal, for example a movie, the system according to the invention 904 records the received signal on the recording device like a DVD+RW, a compact disk or a harddisk. When a user wants to play a recorded movie, the system according to the invention 904 retrieves the appropriate data from the recording device. The television set 906 can show the output signal generated from a received signal by the set-top box 902.

What is claimed is:

1. A method of playing a media file from a data carrier, the method comprising the acts of:
   (a) constructing a defect list of sectors of the data carrier known to be corrupt,
   (b) receiving a request to read a media file stored on the data carrier,
   (c) using a file index table to determine the relevant file blocks that belong to the requested media file,
   (d) issuing a request to read data from those sectors that are referenced by the relevant file blocks, and
   (e) playing predefined data for those file blocks of the data carrier that map to a sector on the defect list, the predefined data being used to conceal the defective sector.

2. The method of claim 1, wherein the file index table is configured to map file blocks to sectors of the data carrier.

3. The method of claim 1, wherein the defect list is constructed from a first list comprised of defective sectors determined to be defective during a formatting stage of the data carrier and a second list comprised of defective sectors determined to be defective subsequent to the formatting stage.

4. The method of claim 1, further comprising the act of storing a status indicator in the file index table for a file block of the data carrier that maps to a defective sector on the defect list, wherein the status indicator refers to the predefined data to be played for the file block.

5. The method of claim 1, further comprising the act of skipping the reading of data of a file block in the case where the file block maps to a defective sector on the defect list of sectors.

6. The method of claim 1, further comprising the act of updating the defect list of sectors in response to detecting a new defective sector while reading a file block determined to be relevant at said step (c).

7. The method of claim 1 wherein the request to read a media file from the carrier at said step (b) is issued by an application and received by a file system.

8. The method of claim 1, wherein said act (c) of using the file index table to determine the relevant file blocks that belong to the requested media file is performed by a file system.

9. The method of claim 1, wherein said act (d) of issuing a request to read data from those sectors that are referenced by the relevant file blocks is issued from a file system to a disk drive.

10. A computer program product according to claim 1, the computer program product comprising a computer usable medium having computer readable program code embodied on said medium for playing a media file from a data carrier, said computer program product comprising computer readable program code for:
    constructing a defect list of sectors of the data carrier known to be corrupt,
    receiving a request to read data from the data carrier,
    using a file index table to determine the relevant file blocks that belong to the requested media file, responsive to said request,
    issuing a request to read data from those sectors that are referenced by the relevant file blocks, and
    playing predefined data for those file blocks of the data carrier that map to a sector on the defect list, the predefined data being used to conceal the defective sector.

11. A method of recording a media file on a data carrier, the method comprising:
    initializing a list of defective sectors of the data carrier known to be corrupt,
    using a file index table to map file blocks of the media file to non-corrupt sectors of the data carrier;
    recording the media file to the mapped sectors; and
    storing the file index table and list of defective sectors, thereby enabling predefined data to be played for non-recorded file blocks to conceal the defective sectors.

12. The method of claim 11, wherein said recording act further comprises:
    skipping the recording of data of a file block that maps to a defective sector in response to detecting a write error on a sector,
    adding the defective sector of the data carrier to the list of defective sectors, and
    updating the file index table to reflect that the file block that maps to the defective sector has not been recorded on the data carrier.

13. The method according to claim 11, further comprising storing a status indicator in the file index table for a file block of the media file that maps to a sector on the list of defective sectors, wherein the status indicator refers to the predefined data to be played for the file block to conceal the corrupt sector.

14. A system to play a media file from a data carrier, the system comprising:
- a memory for storing a defect list of sectors of the data carrier; the defect list including a bad sector alarm list of sectors that have given at least one read and/or write error,
- mapping means for mapping file blocks of the media file to sectors of the data carrier using a file index table, and
- playing means conceived to play predefined data for a file block of the media file that according to the file index table maps to a sector on the defect list, the predefined data being used to conceal the corrupt sector.

15. A system to play a media file according to claim 14, wherein the file index table for a file block of the media file that maps to a sector on the defect list includes a status that refers to the predefined data to be played for the file block.

16. A system to play a media file according to claim 14, further comprising reading means for by-passing an act of reading the corrupt sector.

17. A system to record a media file on a data carrier, the system comprising:
- mapping means conceived to map file blocks of the media file to sectors of the data carrier using a file index table,
- recording means conceived to record the media file to the mapped sectors; wherein the system is conceived to said recording including, in response to detecting a write error on a sector, skipping recording data on the corrupt sector, updating a bad sector alarm list of sectors of the data carrier that have given at least one write error, and updating the file index table to reflect that the file block that maps on the corrupt sector has not been recorded, and
- a memory for storing the bad sector alarm list and the file index table enabling predefined data to be played for the non-recorded file block to conceal the corrupt sector.

18. The system according to claim 17, further comprising referring means configured to refer to the predefined data.

19. A television set comprising a system according to claim 17.

20. A set top box comprising a system according to claim 17.

* * * * *